United States Patent [19]

Hammond

[11] Patent Number: 5,197,409
[45] Date of Patent: Mar. 30, 1993

[54] AQUATIC TANK DISPLAY SYSTEM

[76] Inventor: Daniel S. Hammond, 1236 Wooded Way, West Chester, Pa. 19380

[21] Appl. No.: 854,722

[22] Filed: Mar. 23, 1992

[51] Int. Cl.$^5$ .................. A01K 63/00; A01K 63/06
[52] U.S. Cl. .................................... 119/5; 211/84; 211/128
[58] Field of Search .................. 119/5, 4, 2; 211/52, 211/84, 128

[56] References Cited

U.S. PATENT DOCUMENTS

| | | | |
|---|---|---|---|
| 895,867 | 8/1908 | Kirk | 211/84 |
| 1,013,032 | 12/1911 | Lund . | |
| 1,044,471 | 11/1912 | Andrews | 211/84 |
| 2,000,451 | 5/1935 | Krieger | 119/5 |
| 2,129,396 | 9/1938 | Archer | 211/137 |
| 3,122,126 | 2/1964 | Yamada | 119/5 |
| 3,255,731 | 6/1966 | Girard | 119/3 |
| 3,324,829 | 6/1967 | De José et al. | 119/5 |
| 3,711,133 | 1/1973 | Werner | 287/54 A |
| 3,724,423 | 4/1973 | Day et al. | 119/4 |
| 3,774,575 | 11/1973 | Patterson | 119/5 |
| 3,997,139 | 12/1976 | Young et al. | 248/165 |
| 4,112,853 | 9/1978 | Tisbo et al. | 108/111 |
| 4,214,421 | 7/1980 | Droese et al. | 119/3 |
| 4,349,293 | 9/1982 | Rosenberger | 404/41 |
| 4,365,590 | 12/1982 | Ruggieri et al. | 119/15 |
| 4,726,477 | 2/1988 | Martin | 211/128 |
| 4,742,798 | 5/1988 | Blackett | 119/3 |
| 4,744,614 | 5/1988 | Gombosi | 312/242 |
| 4,836,142 | 6/1989 | Duback | 119/5 |
| 5,005,521 | 4/1991 | Strong | 119/3 |
| 5,042,425 | 8/1991 | Frost, Jr. | 119/5 |
| 5,067,438 | 11/1991 | Hoffa | 119/5 |

FOREIGN PATENT DOCUMENTS 2239170  9/1972 Fed. Rep. of Germany .

OTHER PUBLICATIONS

Brochure—FIberglass Structural Shapes, RH.

Primary Examiner—John G. Weiss
Attorney, Agent, or Firm—Woodcock Washburn Kurtz Mackiewicz & Norris

[57] ABSTRACT

A system for displaying a plurality of aquatic tanks, such as in an aquarium or pet store includes a first tank support frame portion for supporting a plurality of aquatic tanks at a first level; a second tank support frame portion for supporting a second plurality of aquatic tanks at a second level; and a step frame portion for supporting the first and second support frame portions with respect to an underlying surface so that the aquatic tanks supported by said first and second support frame portions are substantially at eye level. According to one aspect of the invention, the first tank support frame portion, the second tank support frame portion and the step frame portion are fabricated from a plurality of interconnected elongate structural members made of a lightweight, non-corrosive material that will not conduct electricity. The system is easy to deploy, durable against saltwater-induced and other corrosion and protected against transmitting electrical shocks. Second tank support frame portion and the step frame portion are fabricated from a plurality of interconnected elongate structural members made of a lightweight, non-corrosive material that will not conduct electricity. The system is easy to deploy, durable against saltwater-induced and other corrosion and protected against transmitting electrical shocks.

16 Claims, 5 Drawing Sheets

FIG. 4
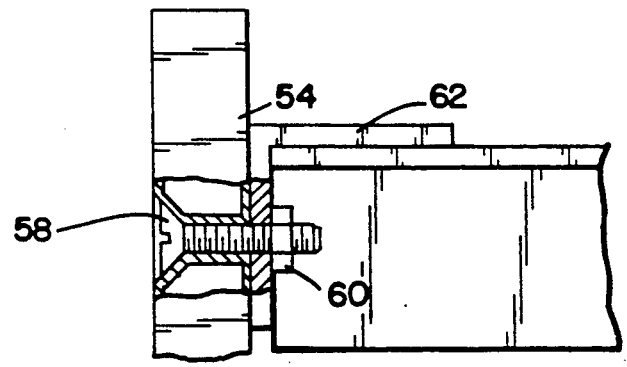
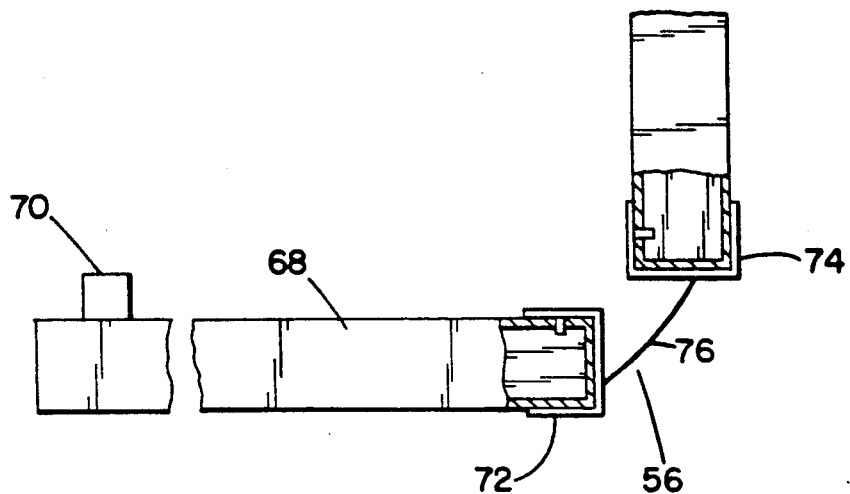
FIG. 3
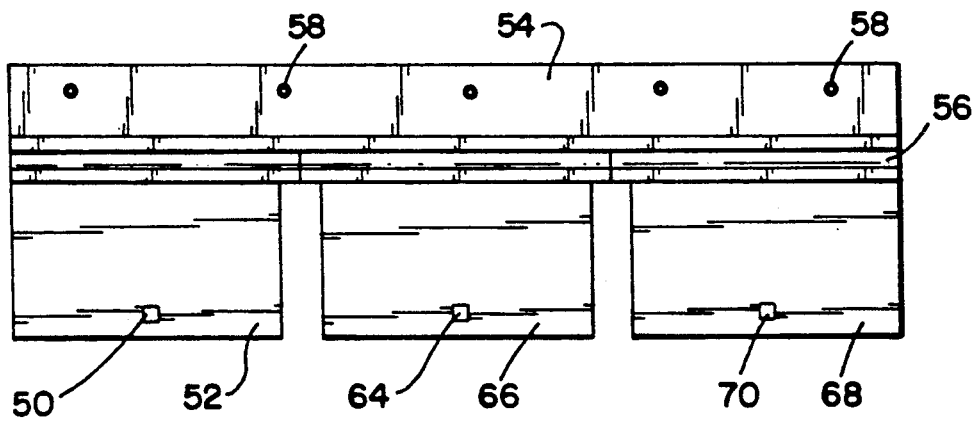
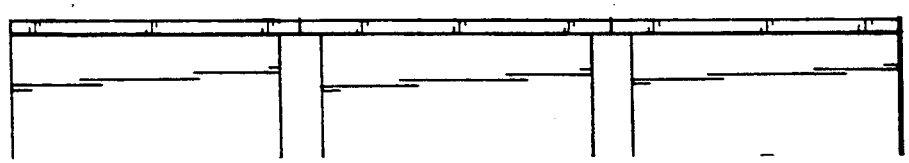

FIG. 5
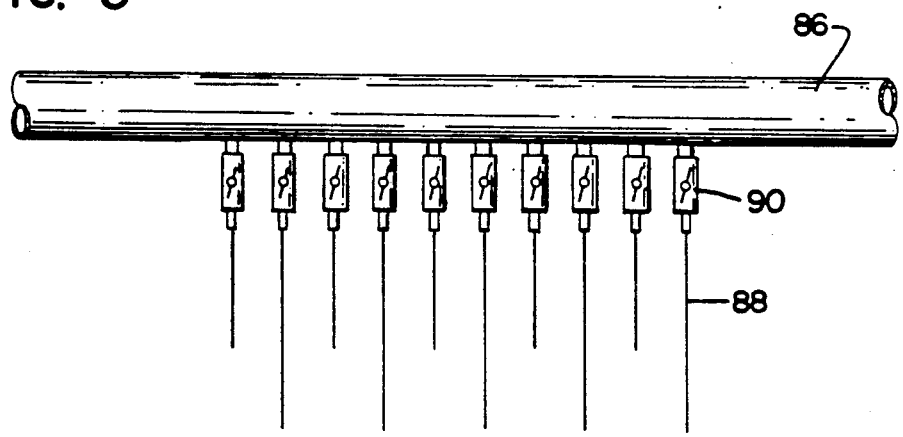
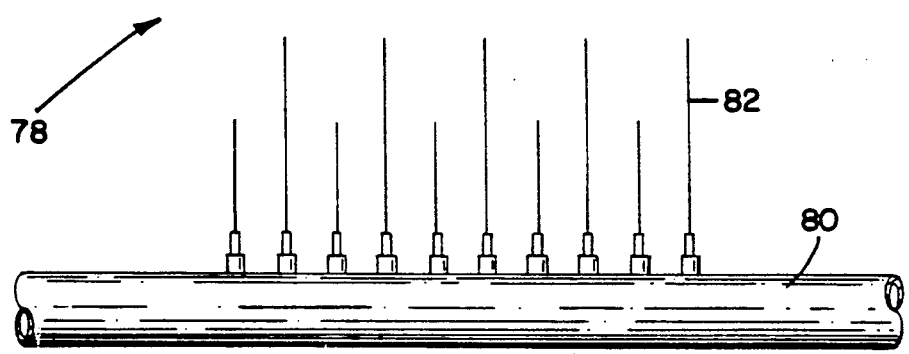
FIG. 6
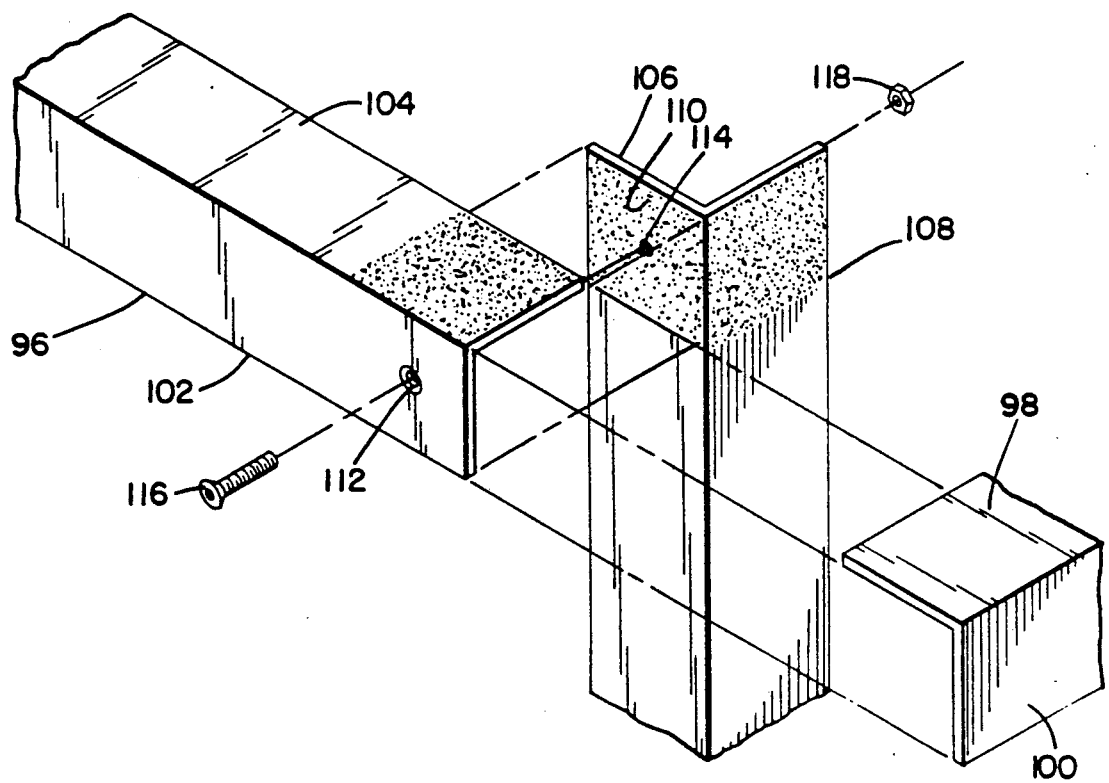

AQUATIC TANK DISPLAY SYSTEM

BACKGROUND OF THE INVENTION

1. Field of the Invention

This invention relates generally to multi-tank aquatic displays of the type which are commonly located in pet stores or aquariums. More specifically, this invention relates to an improved aquatic tank display system which is easy to deploy, durable against salt water-induced and other corrosion, and protected against transmitting electrical shocks.

2. Description of the Prior Art

Most pet stores and aquariums which sell or display aquatic life use a metal platform system, if any system at all, to elevate the required number of aquatic display tanks to the eye level of prospective customers. Individual light fixtures are often placed over each of the tanks to provide illumination, with power strips or extension cords being used to distribute power to the light fixture from a wall outlet. Filtration and aeration systems are also commonly installed in each of the tanks. The various wires and tubes from the filtration, aeration and lighting units were, in most instances, clearly visible to the customers along with the intended aquatic display. This tended to aesthetically diminish the aquatic display as a whole.

In addition, the metal platforms which were used to support the aquatic tanks at eye level were susceptible to corrosion, particularly from leakage or splashing, which often occurs, from salt water tanks which are used to display oceanic marine life. The rust spots and stains created by such corrosion further detracted from the aesthetic appearance of the display.

Another disadvantage of metallic display racks is that they are electrically conductive. This created a risk of an electrical shock being passed on to a customer or to the marine life being displayed in the tanks. This risk was particularly high when used with salt water display tanks, since salt water is electrically conductive as well.

Metal racks are also heavy, and difficult to customize for a particular display design.

It is clear that there has existed a long and unfilled need in the prior art for a system for displaying a plurality of aquatic tanks, such as for an aquarium or pet store, which is more aesthetically pleasing, less susceptible to corrosion, protected against transmitting electrical shocks, more lightweight, and better suited for customization to a particular application than systems which have been known and used in the past.

SUMMARY OF THE INVENTION

Accordingly, it is an object of this invention to provide a system for displaying a plurality of aquatic tanks, such as for an aquarium or pet store, which is more aesthetically pleasing than systems which have been known and used in the past.

It is a further object of the invention to provide such a system, which is less susceptible to corrosion than systems heretofore known.

It is yet further an object of the invention to provide such a system, which is protected against transmitting electrical shocks to customers or to the marine life which is displayed in the tanks.

It is another object of the invention to provide such a system, which is more lightweight than systems heretofore known.

It is yet further an object of the invention to provide such a system, which is more readily customizable for a particular display system configuration than the systems which have been known and used in the past.

In order to achieve the above and other objects of the invention, a system for displaying a plurality of aquatic tanks, such as for an aquarium or pet store, includes, according to one aspect of the invention, a first tank support frame portion for supporting a plurality of aquatic tanks at a first level; a second tank support frame portion for supporting a second plurality of aquatic tanks at a second level; and a step frame portion for supporting the first and second support frame portions with respect to an underlying surface so that the aquatic tanks supported by the first and second support frame portions are substantially at eye level, wherein the first tank support frame portion, the second tank support frame portion and the step frame portion include a plurality of inter-connected elongate structural members, the structural members being fabricated of a light weight, non-corrosive material that will not conduct electricity, whereby the system is easy to deploy, durable against salt water induced and other corrosion and protected against transmitting electrical shocks.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3 is a top plan view of a portion of the embodiment of the invention depicted in FIGS. 1 and 2;

FIG. 4 is a fragmentary side elevational view of a portion of the embodiment depicted in FIGS. 1-3;

FIG. 5 is a schematic depiction of a common filtration system used in the embodiment depicted in FIGS. 1-4;

FIG. 6 is a diagrammatical depiction of a structural element joint of the type which is used in the embodiment depicted in FIGS. 1-5.

DETAILED DESCRIPTION OF THE PREFERRED EMBODIMENT(S)

Figure 1:
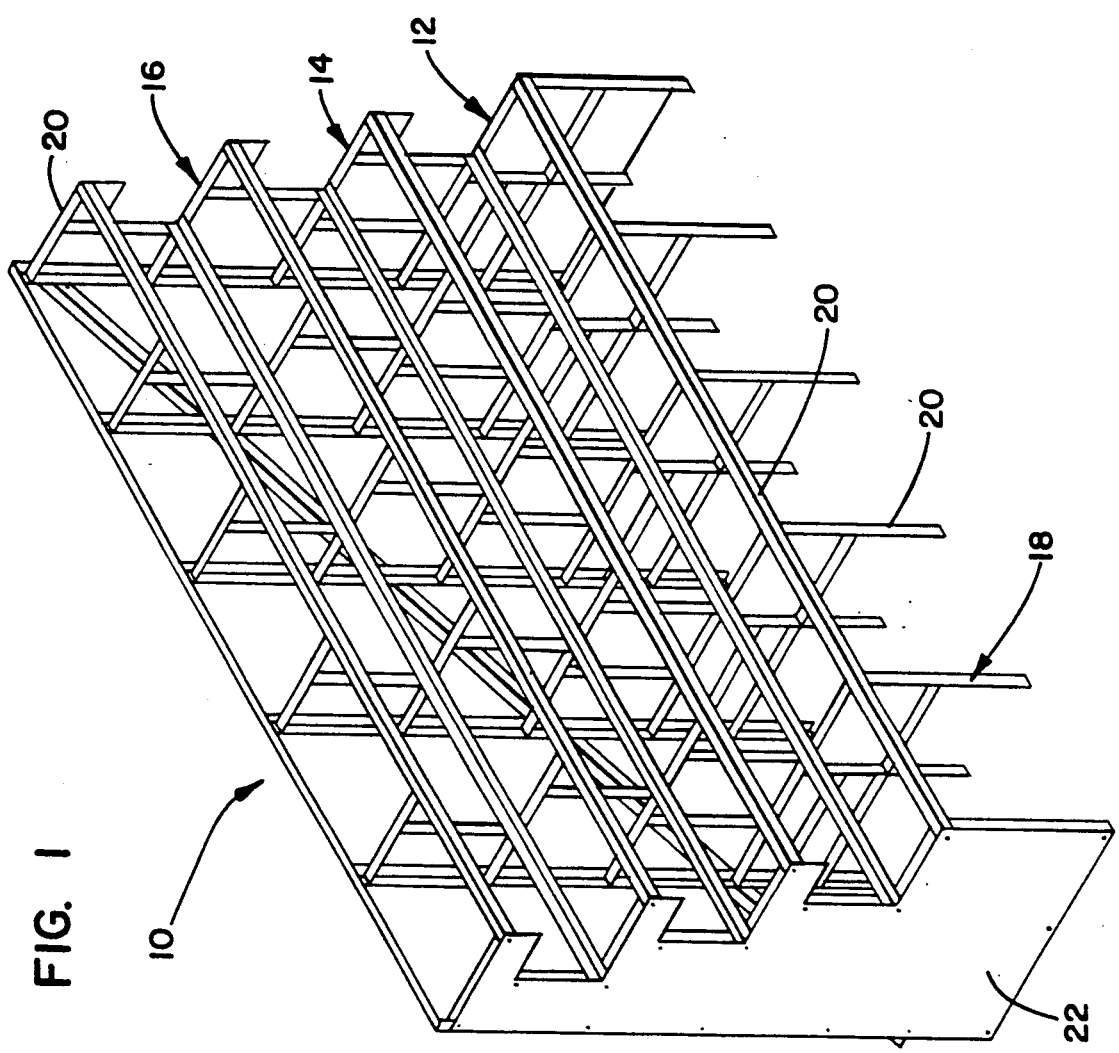
FIG. 1 is a perspective view of a portion of a system constructed according to a preferred embodiment of the invention.

Referring now to the drawings, wherein like reference numerals designate corresponding structure throughout the views, and referring in particular to FIG. 1, a system 10 for displaying a plurality of aquatic tanks includes a first tank support frame portion 12 defining a first surface for supporting a plurality of aquatic tanks at a first level, a second tank support frame portion 14 defining a second surface for supporting a second plurality of aquatic tanks at a second level, and a third tank support frame portion 16 defining a third surface for supporting a third plurality of aquatic tanks at a third level. As clearly shown in FIG. 2, the first support surface is overlapped with the second, and the second with the third. System 10 further includes a step frame portion 18 for supporting the first through third support frame portions 12, 14, 16 with respect to an underlying surface so that the aquatic tanks supported by the first through third support frame portions are substantially at the eye level of a viewer such as a perspective customer in an aquarium or pet store. As may be seen in FIG. 1, the first, second, and third tank support frame portions 12, 14, 16 and step frame portion 18 are constructed of a plurality of inter-connected elongate structural members 20, which in the preferred embodiment are L-shaped in cross section. Preferably, the elongate structural members 20 are fabricated of a light weight, non-corrosive material that will not conduct electricity, so that the system is easy to deploy, durable against salt water induced and other corrosion and protected against transmitting electrical shocks. Most preferably, structural members 20 are fabricated from a combination of fiberglass reinforcements and thermosetting polyester or vinyl ester resin of the type which is sold under the trademark EXTREN ™ by the Morrison Molded Fiber Glass Company. Alternatively, another material having the requisite characteristics could be used within the scope of the invention, although fiberglass is the preferred material. Structural members 20 could alternatively have a cross section other than an L shaped cross section, although it is important that a cross section which is configured to resist bending moments be used.

Figure 2:
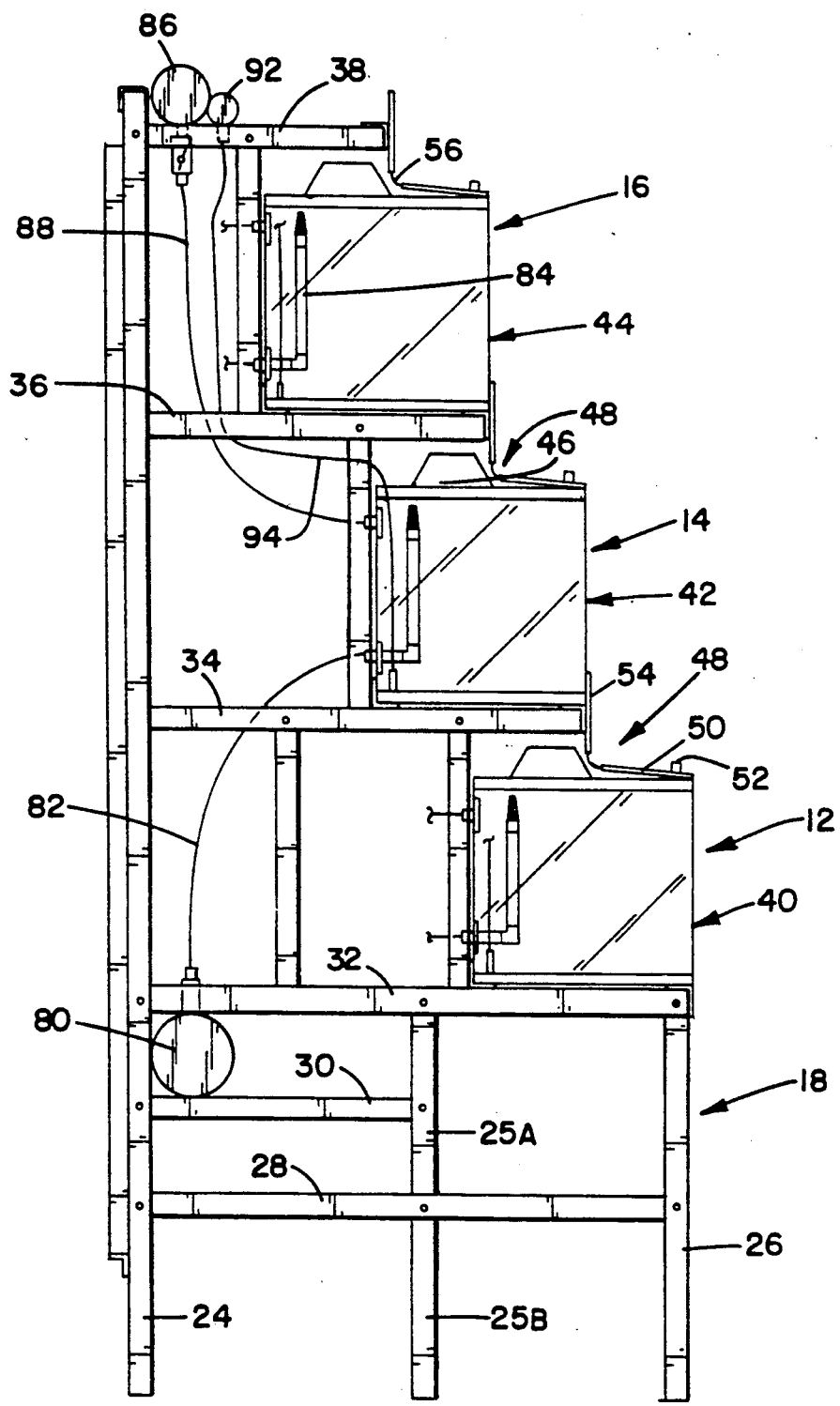
FIG. 2 is a side elevational view of the system depicted in FIG. 1, with portions removed for the purpose of clarity.

Referring now to FIG. 2, it will be seen that the specific structural members 20 which are used in the preferred embodiment of a system 10 include a vertical leg member 24 which extends for the entire height of the system 10, and a second vertical leg member 26, which extends beneath and provides support to the first tank support frame portion 12. System 10 further includes a pair of horizontal members 28, 30 for imparting stability to step frame portion 18, a number of horizontal members 32 which form part of the first tank support frame portion 12, and a number of horizontal members 34, which form part of the second tank support frame portion 14. System 10 further includes a number of horizontal members 36, which form part of the third tank support frame portion 16, and a number of horizontal members 38, which provide support to different elements accordingly to the invention, as will be described in greater detail below. A number of vertical members, including members 25A, 25B are provided to impart additional stability to the various horizontal members 32, 34, 36, 38 as may clearly be seen in FIGS. 1 and 2. It should be understood that the specific number of the above described members 24, 26, 28, 30, 32, 34, 36, and 38 depends upon the desired length of the system, which in turn is dependent upon the number of aquatic tanks that are intended to be supported by each tank support frame portion 12, 14, 16. It should further be understood that, while the framework configuration depicted in FIGS. 1 and 2 is what is presently considered preferred, that alternative framework designs as will be apparent to those skilled in the art could alternatively be used within the scope of the invention.

Referring again to FIG. 2, it will be seen that a number of first aquatic tanks 40 are provided in the first tank support frame portion 12, and that a corresponding number of second aquatic tanks 42 may be provided in the second tank support frame portion 14. Similarly, a number of third aquatic tanks 44 are provided in the third tank support frame portion 16.

As shown in FIG. 2, the open top end of each of the various tanks 40, 42, 44 is partially covered by a lamp fixture 46, which, according to the preferred embodiment of the invention, is designed to longitudinally extend over several adjacent tanks at a time. Most preferably, each lamp fixture 46 contains a fluorescent tube bulb which is approximately 8 feet in length. The lamps 46 are powered by a central lighting system 120, which will be described in greater detail below with reference to FIG. 7.

Referring back to FIG. 2, it will be seen that the exposed top portion of each respective tank 40, 42, 44 which is not covered by the lamp fixture 46 is instead covered by a hinged cover 48, which is best shown in FIGS. 2-4. The hinged cover 48 which is provided for first aquatic tank 40 is identical to that which is provided for the second and third aquatic tanks 42, 44. Hinged cover 48 includes a cover member 50 having a knob 52 on an upper surface thereof, and a skirt member 54 which is hinged with respect to cover member 50 by means of a hinge 56. Referring now to FIGS. 3 and 4, it will be seen that, according to the preferred embodiment, a cover member is provided for each of the individual tanks 40, 42, 44 that are provided are one of the respective levels. Accordingly, FIG. 3 depicts a first cover member 50 which is intended to cover the exposed portion of a first tank on one of the respective levels 12, 14, 16 a second cover member 64 for an adjacent tank, and a third cover member 68 for a tank which is adjacent to the first two tanks. First cover member 50 includes an upper knob 52, second cover member 64 includes an upper knob 66, and third cover member 68 includes an upper knob 70. Skirt member 54, on the other hand, extends longitudinally for a length which is equal to many lengths of the adjacent tanks, and a hinge 56 is provided to join each of the respective cover members 50, 64, 68 to the common skirt member 54. Referring now to FIG. 4, it will be seen that skirt member 54 is fixed in a vertical orientation to a structural member 62 that is attached to one of the respective horizontal members 32, 34, 36, 38 by several nut-bolt combinations 58, 60. Alternatively, nylon screws could be used as an alternative to the nut-bolt combinations 58, 60. Hinges 56, in the preferred embodiment, constitute a first end connector 72 which is fixed to the respective cover member, a second end connector 74 which is fixed to the skirt member 54, and a flexible strip 76 which is fixed at its respective ends to the end connectors 72, 74. Preferably, the entire hinged cover 48 is fabricated from a lightweight, non-corrosive material such as plastic.

Referring back briefly to FIG. 2, it will be seen that the respective skirt members extend above the lower metallic border of the tanks immediately above, and that, when viewed from the front, which is on the right in FIG. 2, a viewer such as a potential customer will see only the aquatic tanks 40, 42, 44 and the hinged covers 48 at eye level. The lamps 46 and the various tubes and wires which are used for the filters, lamps 46 and other accessories will not be visible to such a viewer. This creates an appealing visual effect which, aesthetically, is far superior to that which was created by systems previously known and used. The space within step frame portion 18 can be closed off by installing an optional forward panel, or can alternatively be used to store other inventory, such as fish food or bottom gravel.

Referring now to FIGS. 2 and 5, it will be seen that system 10 further includes a common filtration system 78. Common filtration system 78 includes a filter return manifold 86 which, as may be seen in FIG. 2, extends and is supported by the uppermost horizontal members 38. A number of return lines 88 flow from return manifold 86 to the corresponding number of respective tanks 40, 42, 44. Valves 90 are placed in each of the respective return lines 88, so that the filtration system 78 may continue to operate should one of the tanks 40, 42, 44 be removed for maintenance or cleaning. A filter intake manifold 80 is supported on the horizontal members 30, and is connected to a skimmer 84 in each of the respective tanks 40, 42, 44 by a corresponding number of intake lines 82.

In operation, a filter (not shown) pulls water from filter intake manifold 80, which in turn pulls water from the respective skimmers 84 through intake lines 82. This water is filtered, and is returned by the filter to the filter return manifold 86, which returns the filtered water to the respective tanks 40, 42, 44 via the return lines 88.

Referring now to FIG. 6, the preferred method by which the various structural members 20 are joined together to provide a frame work for a system 10 is diagrammatically depicted. Basically, a first elongate structural member 96 having an L-shaped cross section is joined to a second elongate structural member 98 also having an L-shaped cross section by coating an adhesive to the outer surface of first and second legs 106, 108 of the second structural member 98 near one end thereof, and drilling matching holes through a first leg 102 of the first structural member 96, and the first leg 106 of the second structural member 98. The structural members 96, 98 are then pressed together so that an inner surface of the first leg 102 of the first structural member 96 is pressed against the adhesive coated outer surface of the first leg 106 of second member 98. A bolt 116 is then passed through the aligned holes 112, 114, and a nut 118 is threaded over the bolt 116 to secure the connection. A third elongate structural member also having an L-shaped cross section 100 may be joined to the first structural member 96 in similar fashion, as is diagrammatically depicted in FIG. 6. Preferably, the adhesive used is an epoxy based adhesive which will effectively bond to the resin base of the fiberglass material on the respective structural members 96, 98.

Since the fiberglass structural members 20 are relatively easy to cut and drill, it will be appreciated that it is relatively simple to construct a system 10 according to the dimensions which are considered optimal for a particular application. Construction of a system 10 is further simplified by the fact that the fiberglass material in structural elements 20 is substantially lighter than a similarly sized steel component would be. These features, in conjunction with the non-corrosive and electrically non-conductive properties of the fiberglass material, provide significant advantages over steel racks that have been known and used in the past.

Figure 7:
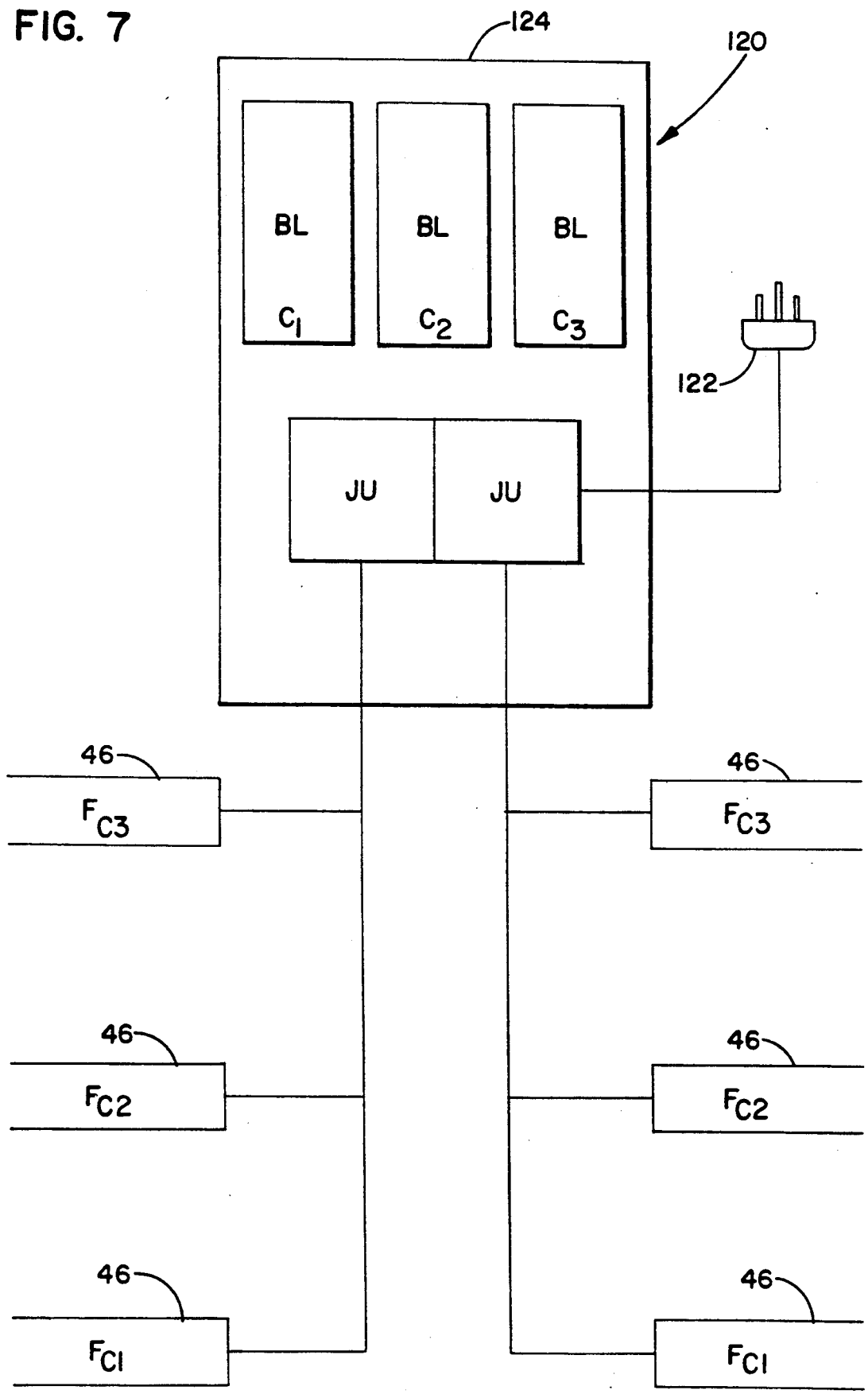
FIG. 7 is a schematic diagram depicting a central lighting system used in the embodiment depicted in FIGS. 1-6.

Another novel aspect of the system 10 is that, instead of each lamp fixture 46 being provided with its own ballast transformer, a central lighting system 120 is provided as is illustrated in FIG. 7. Central lighting system 120 contains a circuit box 124 having a number of ballast transformers BL. Circuit box 124 includes a number of junction boxes JU, which are connected to a wall outlet or other source of electrical power or via an electrical plug 122. Junction boxes JU further include a harness from the respective ballast transformers BL to the respective lamp fixtures 46.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for displaying a plurality of aquatic tanks, such as for an aquarium or pet store, comprising:
   a first tank support frame portion which defines a first support surface for supporting a plurality of aquatic tanks at a first level;
   a second tank support frame portion which defines a second support surface for supporting a second plurality of aquatic tanks at a second level, said first support surface being positioned beneath said second support surface and being overlapped with said second support surface so that an aquatic tank on said first surface will have a portion which is directly beneath an aquatic tank on the second surface; and
   a plurality of cover members movably mounted to said second tank support frame portion for covering upper ends of individual aquatic tanks that are supported on said first support surface, whereby the display system is visually appealing and provides convenient access to tanks on said first support surface without requiring excessive vertical spacing between the first and second support frame portions.

2. A system according to claim 1, wherein said first and second frame portions are fabricated form a material comprising fiberglass.

3. A system according to claim 1, further comprising a third tank support frame portion for supporting a third plurality of aquatic tanks at a third level.

4. A system according to claim 1, wherein said first and second frame portions comprise elongate structural members which have a cross-section that is configured to resist bending moments.

5. A system according to claim 4, wherein said structural members have and L-shaped cross-section.

6. A system according to claim 4, wherein said structural members are connected together by an adhesive joint.

7. A system according to claim 4, wherein said structural members are connected together by a bolted joint.

8. A system according to claim 1 wherein each of said cover members are hingedly mounted.

9. A system according to claim 1, further comprising common filtration means for filtering the water in the plurality of aquatic tanks.

10. A system according to claim 1, further comprising a skirt member fixedly mounted to an end portion of said second tank support frame, said cover members being movable mounted to said skirt member.

11. A system according to claim 10, wherein said cover members are hingedly mounted to said skirt member.

12. A system according to claim 11, wherein said cover members are hingedly mounted to said skirt member by hinge members which comprise a flexible strip of material.

13. A system according to claim 1, wherein said second frame portion comprises a structural member which is cantilevered over said first support surface.

14. A system according o claim 13, wherein said structural member has an L-shaped cross-section.

15. A system according to claim 13, wherein said structural member is fabricated form a material comprising fiberglass.

16. A system for displaying a plurality of aquatic tanks, such as for an aquarium, pet store, comprising:

a first tank support frame portion for supporting a plurality of aquatic tanks at a first level;

a second tank support frame portion for supporting a second plurality of aquatic tanks at a second level;

a step frame portion for supporting said first and second support frame portions with respect to an underlying surface; and fluorescent lighting means for providing illumination to aquatic tanks which are positioned on said first and second support frame portions, said illumination means comprising at least one ballast transformer, said ballast transformer being positioned remotely from said first and second support frame portions for safety purposes.

* * * * *